(12) United States Patent
Derrick et al.

(10) Patent No.: US 6,426,473 B1
(45) Date of Patent: Jul. 30, 2002

(54) VEHICLE STEERING WHEEL

(75) Inventors: John-Oliver Derrick, Hettstadt; Ralph Frisch, Mombris, both of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/693,667

(22) Filed: Oct. 20, 2000

(30) Foreign Application Priority Data

Oct. 21, 1999 (DE) .................................... 299 18 483 U

(51) Int. Cl.[7] .................................................. H01H 9/00
(52) U.S. Cl. ................................. 200/61.54; 280/728.2
(58) Field of Search ............................ 200/61.54, 512, 200/61.85, 345; 280/73, 728.3, 731, 728.2, 728.1, 552, 731.4

(56) References Cited

U.S. PATENT DOCUMENTS

| | | | | | |
|---|---|---|---|---|---|
| 4,655,101 A | * | 4/1987 | Endo et al. | ................... | 74/552 |
| 4,872,364 A | * | 10/1989 | Kaga et al. | ................ | 74/484 H |
| 5,228,362 A | * | 7/1993 | Chen et al. | .................... | 74/552 |
| 5,338,906 A | * | 8/1994 | Yokota | ..................... | 200/61.54 |
| 5,957,489 A | | 9/1999 | Sahara et al. | | |
| 6,086,090 A | * | 7/2000 | Fischer | .................... | 280/728.2 |
| 6,257,615 B1 | * | 7/2001 | Bohn et al. | ............... | 280/728.2 |

* cited by examiner

Primary Examiner—P. Austin Bradley
Assistant Examiner—Lisa Klaus
(74) Attorney, Agent, or Firm—Tarolli, Sundheim, Covell, Tummino & Szabo L.L.P.

(57) ABSTRACT

The invention relates to a vehicle steering wheel, with a switch movably mounted on the steering wheel. The steering wheel comprises a bearing for the switch, the bearing having a guide piece and a bearing piece that encloses the guide piece. The guide piece has a free end with a cone widening outwards towards the free end and transversely to a direction of movement of the switch. The free end forms an end stop in a non-actuated switch position and rests against the bearing piece.

7 Claims, 2 Drawing Sheets

VEHICLE STEERING WHEEL

TECHNICAL FIELD

The invention relates to a vehicle steering wheel with a switch movably mounted on the steering wheel.

BACKGROUND OF THE INVENTION

Vehicle steering wheels are equipped increasingly with switches, the switch with the largest area being the horn switch.

Especially in the case of the horn switch, one endeavors to make this easily movable after a prevalent initial counterforce has been overcome.

BRIEF SUMMARY OF THE INVENTION

The invention concerns a vehicle steering wheel in which the friction that occurs on moving the guide piece to the bearing piece is kept low. This is achieved in a vehicle steering wheel with a switch movably mounted on the steering wheel and a bearing for the switch. The bearing has a guide piece and a bearing piece that encloses the guide piece. The guide piece has a free end with a cone widening outwards towards the free end and transversely to a direction of movement of the switch. The free end forms an end stop in a non-actuated switch position and rests against the bearing piece. Due to the conical end, which holds the switch in its end position in the direction opposite to the direction of movement, it is achieved that the end detaches itself completely from the bearing piece with the slightest actuation of the switch and the amount of friction between bearing piece and guide piece is almost zero. Also, tilting of guide piece and bearing piece, such as could occur in the case of a cylindrical free end mounted in a cylindrical sleeve, can be prevented.

Preferably, the bearing piece also has a conical contact surface against which the cone rests, resulting in direct, rapid separation of the surfaces resting on one another when actuated.

In the end stop, the surfaces have an overall contact with each other because the contact surface of the bearing piece is of complementary design to the conical end piece.

Preferably, play is provided between the bearing piece and the end stop transversely to the direction of movement in order to ensure that contact between guide piece and bearing piece is in fact avoided immediately after actuation.

The switch is preferably mounted on a gas bag module housing. It is mounted completely in such a way that switch and gas bag module housing form a separate preassembled unit which is then fitted into the preferably foam-encased steering wheel skeleton.

DETAILED DESCRIPTION OF PREFERRED EMBODIMENTS

Figure 1:
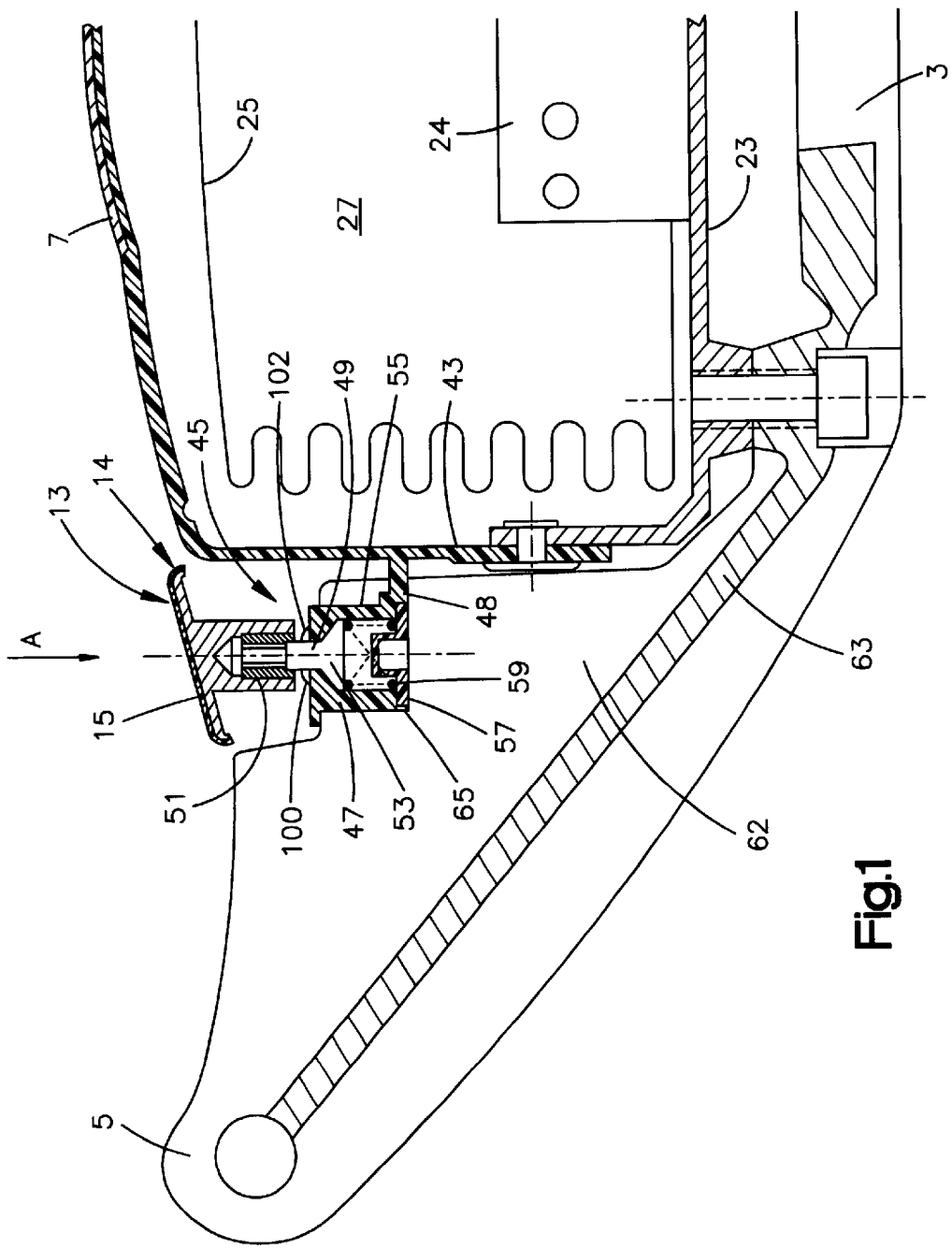
FIG. 1 is a half-section view through a steering wheel according to the invention.

In FIG. 1, a vehicle steering wheel is shown that has a steering wheel hub 3 and a steering wheel rim 5. In the steering wheel hub, there is shown in the lower region a module cover 7 on the front side provided as a single piece with the steering wheel rim. Several switches are attached to the steering wheel hub, for example for operating a telephone or radio, as well as a horn switch 13. The horn switch has an actuating element 14 adapted for being touched externally and having an outer actuating surface 15. The cover 7 is the upper part 43 of a gas bag module housing 23 in which a gas generator 24 and a gas bag 25 are accommodated. Towards the front, the actuating surface 15 of the horn switch 13 protrudes slightly over the module cover 7. The horn switch 13 is decoupled from the cover 7 with respect to the actuation movement. The interior of the gas bag module housing 23 forms a holding chamber 27 for gas generator 24 and gas bag 25.

In the region of the upper edge of the actuating surface 15, to the side of the holding chamber 27 and on the upper part 43 of the gas bag module housing 23, two identical linear bearings 45 are provided, from which only the front one can be seen and which both are fixed to the actuating element 14. The linear bearings 45 each consist of a bearing piece 47 in the form of a hat-shaped lateral protrusion 48 integrally molded on the cover, to be more precise on the upper part 43, and of a guide piece 49 extending through the bearing piece and bolted onto the lower side of the actuating surface 15. The guide piece 49 has an upper end with a thread which is screwed into a threaded bush 51 in the actuating element 14. Moreover, the guide piece 49 has an opposite lower free end 53 with a cone expanding outwards to the free end transversely to the direction of movement A. The conical end 53 rests with its entire surface against a mounting surface of complementary design on the bearing piece in the non-actuated switch position, as shown in FIG. 1. There is play between the largest cross-section of the conical end 53 and a peripheral wall 55 of the bearing piece. A cover 57 is fitted to the bearing piece 47 on the underside of the peripheral wall 55 thus providing a space between the underside of the free end 53 and the cover 57 to accommodate a compression spring 59.

For installing the horn switch 13, the pin-type guide piece 49 is plugged through the bearing piece 47 from below and screwed into the threaded bush 51. Subsequently, the guide piece 49 is pushed into the associated chamber and the chamber is closed with the cover 57.

The horn switch 13 is now completely mounted on the gas bag module housing 23. The unit thus formed is then plugged from above into the foam-encased steering wheel skeleton 63 and removably fitted to it by fastening means that are not shown. In the region of the steering wheel hub, the foam casing 62 of the steering wheel skeleton 63 is provided with an appropriate recess 65 that allows the bearing piece 47 to be pushed in from above together with the cover 57.

The compression spring 59 ensures that the switch has a defined position in the non-actuated state in that it presses the guide piece with its conical end, which forms an end stop, against the contact surface of the bearing piece 47.

On actuating the horn switch 13, the conical end 53 separates completely from the bearing piece 47 so that no tilting and no static friction occurs and the horn switch can be actuated easily against a uniform pressure. In the actuated state, the metallic bush 51 connects two electrical contacts 100 and 102 to actuate the horn signal.

If the gas generator is actuated, the gas bag 25 deploys and tears open the front module cover 7.

Figure 2:
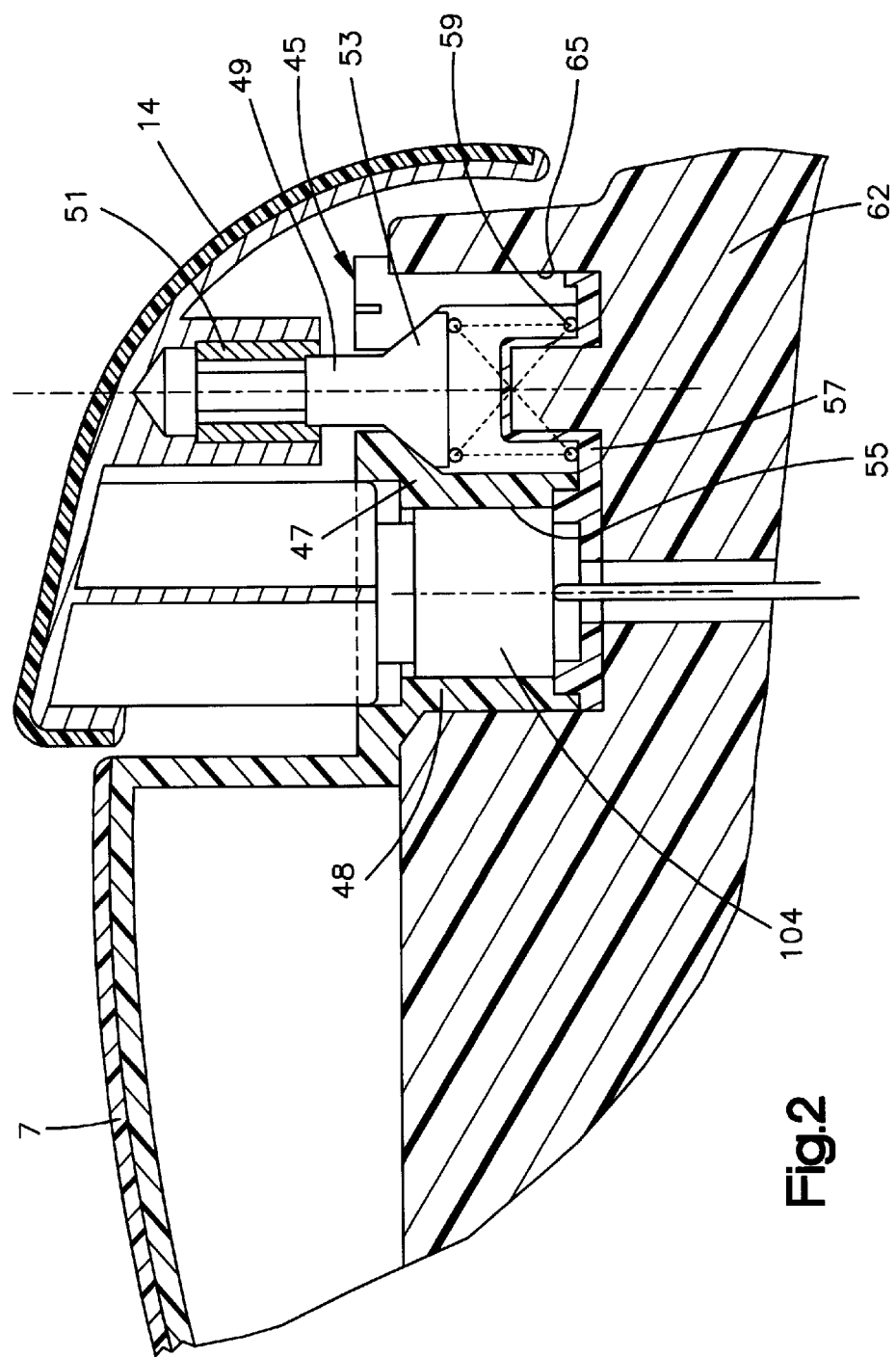
FIG. 2 is a sectional view of a different embodiment of the switch used in FIG. 1.

In the embodiment according to FIG. 2, the switch 13 has an electric switching member instead of the contacts 100, 102, which member is actuated from the rear side of the actuating element 14. The switching member 104 is embedded in a recess in the protrusion 48 with an interlocking fit.

What is claimed is:

1. A vehicle steering wheel, with a switch movably mounted on said steering wheel, said steering wheel comprising:
   a bearing for said switch, said bearing having a guide piece and a bearing piece that encloses said guide piece;
   said guide piece having a free end with a cone widening outwards towards said free end and transversely to a direction of movement of said switch, said free end forming an end stop in a non-actuated position and resting against said bearing piece, said guide piece having a thread at its end opposite to said conical end.

2. The vehicle steering wheel according to claim 1, wherein said bearing piece has a conical contact surface for said conical end.

3. The vehicle steering wheel according to claim 2, wherein said contact surface is of complementary design to said conical end.

4. The vehicle steering wheel according to claim 1, wherein said bearing piece has play transversely to said direction of movement in relation to said conical end when said switch is actuated.

5. The vehicle steering wheel according to claim 1, wherein said switch is a horn switch.

6. The vehicle steering wheel according to claim 5, wherein said horn switch has an actuating surface on an outside into the rear of which said guide piece is screwed with penetrating said bearing piece.

7. A vehicle steering wheel, with a switch movably mounted on said steering wheel, said steering wheel comprising:
   a bearing for said switch, said bearing having a guide piece and a bearing piece that encloses said guide piece;
   said guide piece having a free end with a cone widening outwards towards said free end and transversely to a direction of movement of said switch, said free end forming an end stop in a non-actuated position and resting against said bearing piece;
   said switch being mounted on a gas bag module housing, said gas bag module housing including a cover having a lateral protrusion, said protrusion being provided with said bearing piece, a movable actuating element and an electric switching member being provided, said protrusion having a recess, said electric switching member being accommodated in said recess and adapted to be switched by means of said movable actuating element.

* * * * *